R. FOCK.
WATER TRAP.
APPLICATION FILED JAN. 27, 1908.

921,688.

Patented May 18, 1909.

Witnesses:
Harry Pausch
A. J. Hadden

Inventor:
Rudolph Fock
per H. J. Hadden
Attorney.

UNITED STATES PATENT OFFICE.

RUDOLPH FOCK, OF HANOVER, GERMANY.

WATER-TRAP.

No. 921,688.     Specification of Letters Patent.     Patented May 18, 1909.

Application filed January 27, 1908. Serial No. 412,874.

*To all whom it may concern:*

Be it known that I, RUDOLPH FOCK, a subject of the German Emperor, residing at Hanover, in Germany, have invented a certain new and useful Water-Trap, of which the following is a specification.

The purpose of the present invention is to prevent the emptying of water-traps by suction.

In the case of ordinary water-traps placed between basins or pans and waste-pipes, it has been found that where a plurality of traps communicate with a single waste-pipe the discharge of a large quantity of water through the latter is liable to produce suction by which the water-seals are removed from the traps, even if air-pipes are provided. The present invention obviates this disadvantage.

A construction embodying the invention is shown in the annexed drawing, in which—

Figures 1, 2:
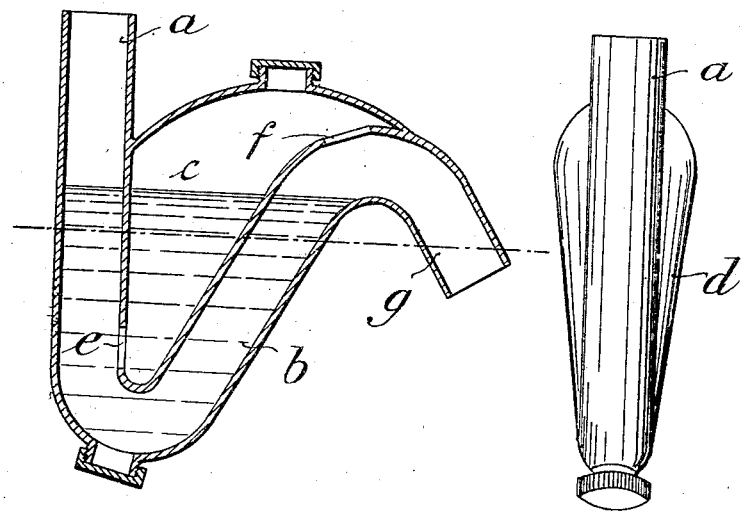
Figure 3:
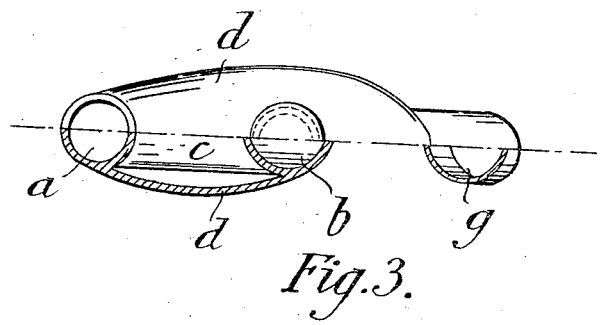

Figure 1 is a vertical, longitudinal section of the improved trap, Fig. 2 an end-view, and Fig. 3 a plan-view, half in section.

The vertical leg $a$ of the trap communicates with a basin or pan not shown in the drawing, and the part $g$ communicates with the waste-pipe, which is also not shown. Between the legs $a$ and $b$ an external chamber $c$ is formed, with outwardly bulging sidewalls $d$, as shown in Figs. 2 and 3. The chamber $c$ communicates with the trap-pipe by means of orifices $e$ and $f$ located at or near the lower and upper knees respectively. The axis of the orifice $f$ is in the central vertical plane of the trap-pipe; it is immaterial in what position relative to this plane the orifice $e$ is placed. The size of the orifices $e$ and $f$ depends on the size of the trap-pipe.

Normally the legs $a$ and $b$ and the chamber $c$ contain water at a uniform level, as shown in Fig. 1. If a rush of water down the waste-pipe causes suction to be produced at $g$ there is a diminution of air-pressure above the water in the chamber $c$, and the water-level in the said chamber rises, water being sucked into the chamber through the orifice $e$. When the suction ceases water flows from the chamber $c$ through the orifice $e$ to the trap-pipe, so that the seal remains intact.

The construction is distinguished from other forms of trap having a communicating chamber by the relatively large capacity of the chamber above the normal water level up to the orifice $f$ so that the water drawn into the trap by suction will not reach the orifice $f$ or be drawn therefrom and lost. The other orifice $e$ is also placed so far below the normal water level that when suction occurs the water will not be drawn so far down the leg $a$ as to permit air to enter at the orifice $e$.

It will be seen that the construction of the trap is very simple, and the action thereof is very effective and reliable.

What I claim as my invention and desire to secure by Letters Patent of the United States is:—

The combination with a tubular water-trap comprising lower and upper tubular knees, of an external chamber divided from said water trap, located above the lower knee of the trap and communicating with the water trap by means of orifices located closely before the lower knee and above the upper knee respectively, the said chamber having a free capacity between the normal water level and the upper orifice greater than the bulk of water capable of being drawn therein by suction, and the lower orifice being located below the lowest water level temporarily produced in the trap by said suction, for the purpose set forth.

In witness whereof I have signed this specification in the presence of two witnesses.

RUDOLPH FOCK.

Witnesses:
ROBERT V. BÜLOW,
M. L. THOMPSON.